UNITED STATES PATENT OFFICE 2,508,334

2,4,5-TRICHLOROPHENOL ESTERS

Clarence L. Moyle, Clare, Mich., assignor to The Dow Chemical Company, Midland, Mich., a corporation of Delaware No Drawing. Application March 20, 1948,
Serial No. 16,141

6 Claims. (Cl. 260—479)

The present invention relates to the 2,4,5-trichlorophenyl esters of the halo-aliphatic acids and is particularly concerned with compounds having the following formula:

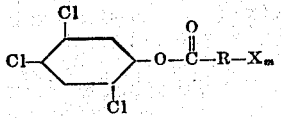

wherein R represents an alkyl residue containing from 1 to 2 carbon atoms, X is a member of the group consisting of bromine and chlorine, and $m$ is an integer not greater than 2. These compounds are adapted to be employed as preservatives for paper, paint, and wood, and as intermediates for the preparation of more complex organic derivatives.

Members of the above-identified group of compounds are oils or crystalline solids somewhat soluble in many organic solvents and relatively insoluble in water. These compounds are comparatively stable to light and air, are not appreciably affected by carbon dioxide, and are non-corrosive to the skin of man and higher animals.

The new compounds may be prepared by reacting 2,4,5-trichlorophenol or its alkali metal salts with a haloalkanoyl halide such as chloroacetyl chloride, bromoacetyl bromide, dichloroacetyl chloride, trichloroacetyl chloride, alpha-chloropropionyl chloride, alpha-bromopropionyl bromide, beta-bromopropionyl bromide, alpha,-beta-dibromopropionyl bromide, alpha,alpha-dichloropropionyl chloride, alpha,beta-dichloropropionyl chloride, and beta-chloropropionyl chloride. Substantially equimolecular proportions of the 2,4,5-trichlorophenol or its alkali metal salt and the haloalkanoyl halide have been found to give good yields, although these proportions are not critical. Upon completion of the reaction, the desired product may be obtained in substantially pure form by either fractional distillation or recrystallization, depending upon the physical nature of the crude reaction product.

In the preferred method of operation an alkali metal salt of 2,4,5-trichlorophenol is dispersed in an inert solvent, such as carbon tetrachloride, methylene chloride, ethylene dichloride, benzene, xylene, chlorobenzene, or petroleum ether. To the dispersion of the alkali metal 2,4,5-trichlorophenate, a haloalkanoyl halide is added portionwise with stirring and cooling, where necessary, to control heat of reaction. The reaction conveniently is carried out at the boiling temperature of the reaction mixture. Following completion of the reaction, the by-product salt is removed by filtration and the filtrate distilled under reduced pressure, first to remove the solvent and small amounts of phenolic impurities and then to obtain the desired ester product.

In an alternative procedure the haloalkanoyl halide is reacted directly with 2,4,5-trichlorophenol. The reaction is carried out at the reflux temperature of the reaction mixture and is accompanied by the evolution of hydrogen halide. Following completion of the reaction the mixture is distilled under reduced pressure, first to remove the small amounts of phenolic impurities and then to obtain the product.

The following examples set forth specific embodiments of the invention but are not to be construed as limiting the same.

Example 1

43.9 grams (0.2 mole) of sodium 2,4,5-trichlorophenate was dispersed in 100 milliliters of carbon tetrachloride, and 22.6 grams (0.2 mole) of chloroacetyl chloride added portionwise, over a period of ten minutes, with stirring and sufficient cooling to prevent excessive boiling of the solvent. After one-half hour the solvent was evaporated, leaving an oily residue which crystallized on standing at room temperature. This product was recrystallized from cyclohexane to obtain 2,4,5-trichlorophenyl monochloroacetate, which had a melting point of 80.5° C.

Example 2

59.3 grams (0.3 mole) of 2,4,5-trichlorophenol and 44.3 grams (0.3 mole) of dichloroacetyl chloride (boiling at 104°–107° C.) was heated under reflux for four hours. This mixture was then distilled under reduced pressure, first to recover small quantities of unreacted 2,4,5-trichlorophenol and then to obtain 2,4,5-trichlorophenyl dichloroacetate. This compound had a melting point of 46° C.

Example 3

29 grams (0.228 mole) of beta-chloropropionyl chloride (boiling at 140°–142° C.) and 45 grams (0.23 mole) of 2,4,5-trichlorophenol were mixed together and heated under reflux for 45 minutes at 110° to 120° C. Upon fractional distillation of the reaction mixture, 2,4,5-trichlorophenyl beta-chloropropionate was obtained as a colorless oil having a density of 1.43 at 25° C.

Example 4

43.8 grams (0.2 mole) of sodium 2,4,5-trichlorophenate was suspended in 150 milliliters of methylene chloride and 32 grams (0.25 mole) of alpha-chloropropionyl chloride (boiling range 108°–110° C.) added portionwise to the reaction mixture over a period of five minutes, with stirring and sufficient cooling to avoid excessive boiling of the solvent. This mixture was heated under reflux for one-half hour. The sodium chloride formed during the reaction was removed by filtration and washed with 50 milliliters of methylene chloride. The filtrate and washings were combined and distilled under reduced pressure, first to remove the solvent and unreacted 2,4,5-trichlorophenol and then to obtain 2,4,5-trichlorophenyl alpha-chloropropionate, having a melting point of 49°–50° C.

Example 5

59.3 grams (0.3 mole) of 2,4,5-trichlorophenol and 60.6 grams (0.3 mole) bromoacetyl bromide (boiling at 147°–150° C.) were heated under reflux for one hour. This mixture was then distilled under reduced pressure, first to recover small quantities of unreacted 2,4,5-trichlorophenol and then to obtain 2,4,5-trichlorophenyl monobromoacetate. This compound was found to have a freezing point of 82° C., and a boiling point of 167°–177° C. at 4 millimeters pressure.

I claim:

1. The 2,4,5-trichlorophenol esters having the formula:

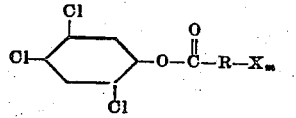

wherein R represents an alkyl residue containing from 1 to 2 carbon atoms, X is a member of the group consisting of chlorine and bromine, and $m$ is an integer not greater than 2.

2. The 2,4,5-trichlorophenol esters having the formula:

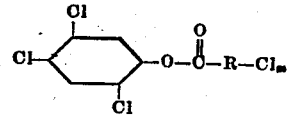

wherein R represents an alkyl residue containing from 1 to 2 carbon atoms, and $m$ is an integer not greater than 2.

3. The 2,4,5-trichlorophenol esters having the formula:

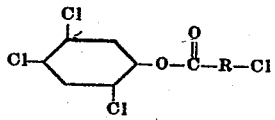

wherein R represents an alkylene radical containing from 1 to 2 carbon atoms, inclusive, and the chlorine is substituted on the carbon atom alpha to the carbonyl group.

4. 2,4,5-trichlorophenyl dichloroacetate.
5. 2,4,5 - trichlorophenyl alpha-chloropropionate.
6. 2,4,5-trichlorophenyl monochloroacetate.

CLARENCE L. MOYLE.

REFERENCES CITED

The following references are of record in the file of this patent:

Tarbell, Jour. Am. Chem. Soc., vol. 65, pps. 2169–2174 (1943).